United States Patent [19]

Libove et al.

[11] Patent Number: 4,584,617
[45] Date of Patent: Apr. 22, 1986

[54] METHOD AND APPARATUS FOR IMPROVING THE TRANSFER TIME IN ROTATING DATA STORAGE SYSTEMS

[75] Inventors: Joel Libove, Berkeley; Paul V. Wilcox-Baker, San Francisco, both of Calif.

[73] Assignee: Dual Systems Corporation, Berkeley, Calif.

[21] Appl. No.: 534,902

[22] Filed: Sep. 22, 1983

[51] Int. Cl.⁴ ............................................. G11B 5/09
[52] U.S. Cl. ..................................... 360/49; 360/39
[58] Field of Search ................... 360/39, 48, 49, 54, 360/72.1, 72.2

[56] References Cited

U.S. PATENT DOCUMENTS

4,393,445  7/1983  Milligan ........................... 360/72.2
4,494,157  1/1985  Ina et al. ............................. 360/98

Primary Examiner—Vincent P. Canney
Attorney, Agent, or Firm—Townsend & Townsend

[57] ABSTRACT

A method and apparatus for improving the average throughput of rotating magnetic or optical data storage systems. Multiple-sector data along a given track 120 is transferred between the rotating media and the disk controller circuitry essentially within a single rotation as each desired sector passes under the read/write head, even if out of order. The method is implemented in the hardware and/or firmware of a disk controller.

12 Claims, 4 Drawing Figures

METHOD AND APPARATUS FOR IMPROVING THE TRANSFER TIME IN ROTATING DATA STORAGE SYSTEMS

BACKGROUND OF THE INVENTION

1. Technical Field

This invention relates to rotating memory systems of the type used to store data in digital computer systems, and particularly to a technique for improving data transfer time.

2. Prior Art

Rotating mechanical data storage devices such as disk drives transfer data much less rapidly than electronic memories, registers, and data channels. To avoid component mismatches, prior art disk drive controllers have been designed with buffer memories for fast transfers to or from data channels and main memories, and for slow transfers to or from disks. Although a disk drive controller buffer shortens the employment of the fast devices buffered from the disk, such a buffer does not help with the separate problem of time wasted while wanted-but-out-of-sequence sectors on the disk pass, and thus does not advance the start of, or reduce the time needed for the actual disk transfer. In some systems it is desirable to reduce this waiting time.

Data in physical records or blocks is generally serialized and stored on a track in fairly evenly spaced "sectors" arranged in a logical sequence, either in consecutive or in interleaved numerical order. Each sector begins with a "header" portion containing identification numbers unique to that sector, which is followed by a data storage portion. In addition, the sector may contain synchronization and error detection or correction information, which is not of interest to the subject invention and therefore will not be discussed here.

To read data from or write data to a disk on a moving-head drive, a conventional disk controller first generates signals for the drive to move the head to the appropriate track. The controller does not transfer data until the first desired record, which may be in any one of the sectors on the disk, rotates up to the head. Since the sectors are initialized in continually ascending numerical order, and since it is indeterminate which sector will be recognized first, "dead time" waiting is required until the lowest-numbered sector to be read or written rotates into position. This waiting period is generally wasted. In some single sector or partial-track transfers, no desired sectors pass under the head during the waiting period, so the wait is unavoidable. However, on the average in multi-sector transfers, there is a waiting period of half a rotation for the desired initial sector number to pass under the read/write head. During this waiting period, many desired higher-numbered sectors may pass under the head but no data transfer to these sectors takes place until they return after the lower-numbered sectors. For example, if the disk rotates at 3,600 rpm and the desired operation is a data read from sectors 3 through 20 on a specified 24-sector track, and the head seeks and happens to settle on the track as sector 8 is passing, then the desired read operation is delayed while sectors 8-24, 1 and 2 pass. Only then are sectors 3 through 20 read. The resulting 12-sector (8 to 20) half-rotational delay is approximately 8 milliseconds, which is undesirable. In this example the dead time can vary from none to approximately 16 milliseconds for a full rotation, depending upon the location at which the head happens to settle on the track. The range of dead time varies inversely with respect to the speed of the disk.

The wasted time while wanted-but-out-of-sequence sectors pass might be eliminated by transferring sectors in whatever sequence they pass. This has been done in a prior art low speed floppy disk controller which uses part of the main memory as a look-up table. In such a system, when the central processing unit of the computer requests that data be transferred into or out of the main memory, the number of records, record length, and starting address of the first record in the main memory are used by the disk controller to calculate the main memory addresses corresponding to sector numbers on the disk. The calculation for each sector involves subtracting the starting sector from the desired sector number, multiplying the difference by the record length, and adding an offset equal to the starting source or destination address in the main memory. Then, for reading or writing to the disk, track sector numbers are read, sent via the data channel to the main memory, and used as an address to the table to see if a transfer is wanted for that sector. If the table indicates a transfer, one is made. The address of the corresponding block in the main memory is computed dynamically by using the above-mentioned calculation. Alternatively, the memory address may be retrieved from a table of previously computed addresses stored in the disk controller, or in the main memory. If single blocks cannot be transferred directly to arbitrary locations in main memory, then, in addition to the table, an intermediate storage buffer must be provided in the memory. This achieves the transfer of all data wanted on a track within one revolution, but occupies the memory channel for table look-ups during the entire revolution. Even with the channel constantly occupied by the disk transfer, the transfer speed is limited by the requirement that the header numbers be transmitted to the main memory table, and for disk writing the requirement that the block then be fetched from the memory and transmitted to the disk drive. Verifying the transfer requires the memory and channel to be tied up twice as long so that the data on the disk can be read back through a CPU register and compared with the blocks in the main memory. Buffers in the memory or disk drive do not save time if the data channel is occupied anyway looking up sector numbers in a main memory table.

The floppy disk method, unfortunately, is not readily adaptable to high-speed, hard disk systems, especially for writing, since it is difficult to fetch data from main memory in the instant between a sector header being read and its data area beginning to pass the head. The critically short memory latency time may be shorter or not even immediately available in multiuser systems when the system memory required by the disk controller is tied up and interrupted by other devices. Therefore, the technique used for a floppy disk controller is unsatisfactory for hard disk controllers, which have much higher data transfer rates.

SUMMARY OF THE INVENTION

The invention comprises a method and apparatus for transferring all requested data to or from a disk track in no more than one revolution, while minimizing use of an associated data channel.

From an apparatus standpoint, in a preferred embodiment of the invention a disk drive controller connected between a disk drive and a data channel from a computer, is adapted to include a sector wanted indicator initializable by signals on the data channel, and responsive to disk sector identification numbers by producing sector wanted signals indicative of whether data is to be transferred between the data channel and the identified disk sector. This allows disk data transfers within essentially the first disk revolution and saves the time needed by the prior art controller for sector numbers to be transmitted over the data channel to address a table in the main memory. Therefore, controllers with the invention operate faster than controllers with buffers alone, or with a table at the main memory end of the data channel, so the invention may be used with higher speed hard disk drives. Positioning the sector wanted indicator between the disk drive and the memory channel (rather than between the other end of the channel and the main memory) frees the channel and allows advantageous use of a disk drive buffer. Further, in another embodiment, the combination of a dedicated sector wanted indicator and dedicated Full Track Buffer (FTB) allows the buffer to be addressable by sector numbers read off the rotating disk, so that out-of-sequence sectors are automatically sorted as they are loaded into the buffer. This saves the expense of providing, and the delay of using, a multiplier and offset-adder in the CPU or in the disk controller circuitry to calculate main memory locations. Instead, the buffer, filled with sorted sectors, is read into the main memory in one-byte increments from the given starting address. Finally, verification can be done in the next disk revolution without using the channel at all, by comparing sectors one by one with the full-track buffer.

From the standpoint of operational method, the computer provides the controller with a list of block numbers in the disk drive, and the starting address in the computer main memory to or from which data is to be transferred. The block numbers are used by the controller to calculate disk track and sector numbers. After the head settles onto the track, the controller waits for a sector header. As soon as any valid sector header is read, it is compared with the desired sector list boundaries stored in the sector wanted indicator. If the sector number is within the boundaries, the controller transfers sector data between the disk and the appropriate location in the FTB. After each sector, the controller waits for another header and repeats the process. Any sector headers not within the boundaries are ignored, and no data is transferred. The process is repeated until all requested sectors have been transferred. Thus, the transfer of the entire track is completed within one revolution after the first header is read, regardless of the order in which sectors appear on the track, or which sector the disk head encounters first.

This significantly improves disk system throughput over prior art systems which cannot transfer sectors in arbitrary order. Compared to prior art systems which have the capability to match sector header numbers dynamically against record numbers, the invention has the advantage of easing critical memory latency requirements. Furthermore, one alternate embodiment of the invention obviates the need for dynamically computing, or looking up, main memory addresses, and also allows an out-of-order disk transfer while guaranteeing a strictly sequential memory transfer. The aforesaid prior art systems do not have these capabilities.

DETAILED DESCRIPTION OF THE PREFERRED EMBODIMENTS

Figure 1:
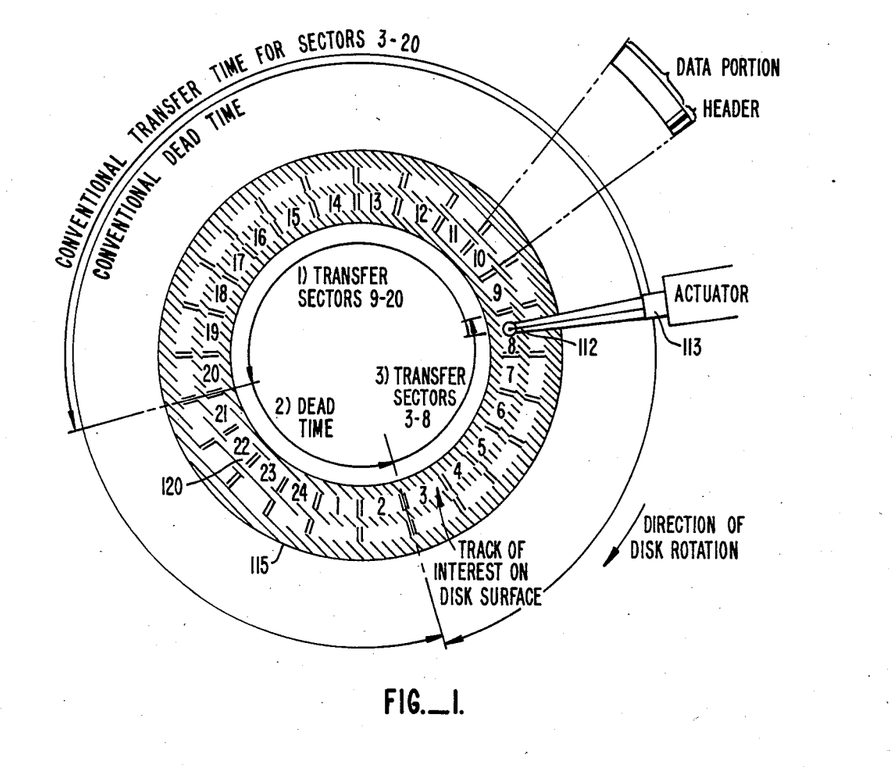
FIG. 1 is a schematic of a disk platter showing a possible sequence of sectors on one of the concentric tracks.

Turning now to the drawings, FIG. 1 illustrates the manner in which this invention transfers data to and from a typical sectored disk track on the recording surface of a rotatable disk. A read/write transducer 112 is carried on the end of a radially movable transducer arm 113. The transducer is capable of writing data from and reading data onto the recording surface.

Out-of-order sector transfers may be implemented in various ways in most disk controller architectures. The following description is only meant to illustrate one of many possible implementations.

Figure 2:
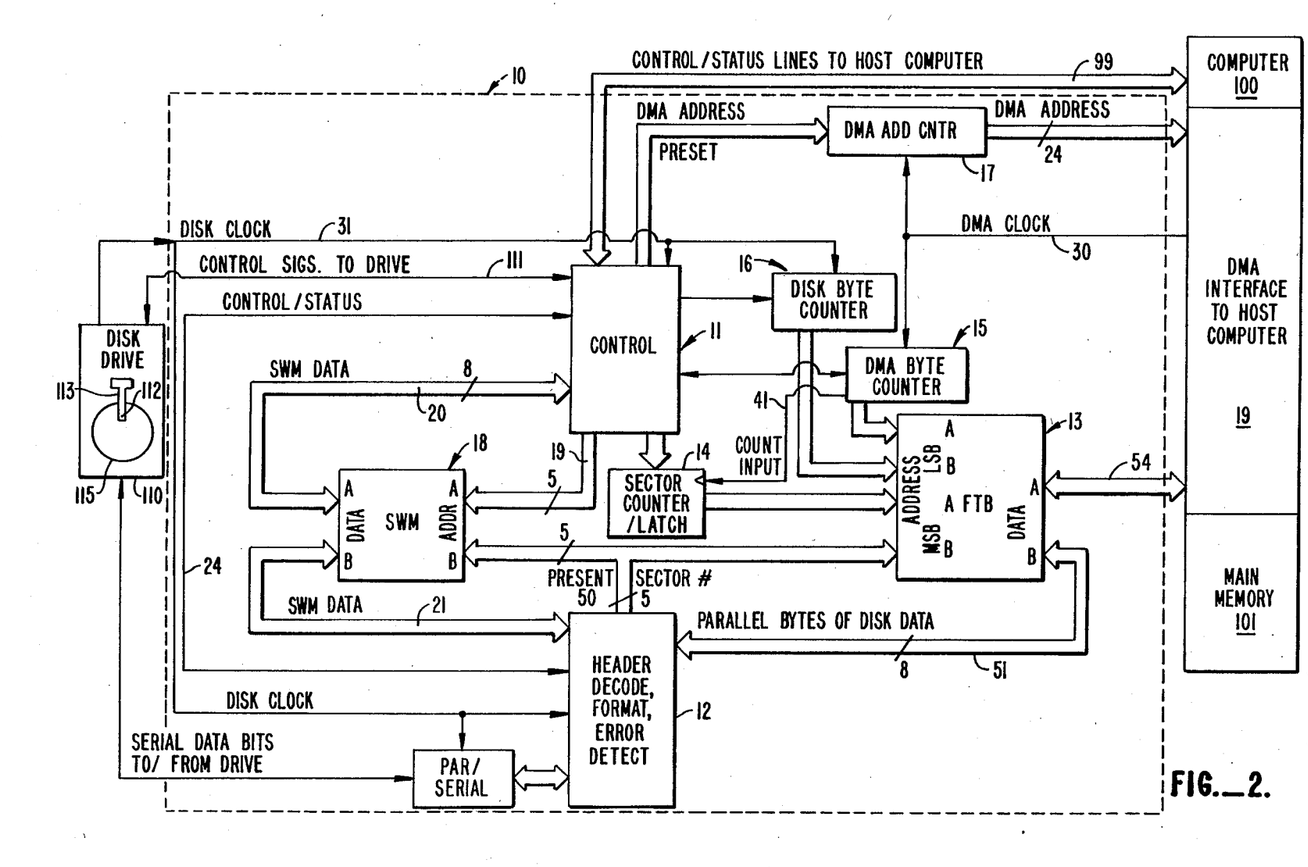
FIG. 2 is a diagram of the main functional blocks in a preferred embodiment having two-port memories and used between a computer memory system and a disk drive system.

FIG. 2 shows the invention as a disk drive controller 10, which interfaces a computer system 100 and a disk drive 110. The main functional blocks in this embodiment are: a control circuit 11, a formatting circuit 12, a Full-Track Buffer (FTB) memory 13, counters 14, 15, 16 and 17, a sector wanted indicator, and a conventional Direct Memory Access (DMA) interface 19.

Control circuit 11 is built with conventional integrated circuit registers and gates, or is based on a conventional microprocessor. Control circuit 11 decodes commands on bus 99 from the host computer system 100, controls seeking to the proper disk track, and initializes and oversees the remaining circuitry in the invention.

Formatting circuit 12 may be a conventional shift register and associated circuitry for serializing and deserializing the data being transferred between the disk and computer 100. Formatter 12 also separates the header information (particularly the sector number) from the data portion of each sector. In the example of FIG. 2, formatter 12 outputs a five-bit "present sector" identification number, allowing up to 32 ($2^5$) sectors to be identified on each track.

The FTB memory 13 is made up of conventional integrated memory circuits such as 4164 RAM IC's. FTB 13 allows data to be written in one order, and read out in another, and allows uninterrupted transfer of data to and from an entire disk track, regardless of the readiness status of memory 101 in host computer system 100. Using a two-port FTB 13, disk-to-FTB transfers may be overlapped with system memory-to-FTB transfers, allowing faster completion. The most significant (5 for example) address inputs to FTB memory 13 are the number of the sector to or from which data will be transferred. The most significant address bits automatically map "out-of-order" disk sectors into ascending numerical order. The least significant (9 for example) address inputs correspond to byte numbers within each sector. Hence, the FTB memory may be divided logically (not physically) into 32 sectors ($2^5$), each with up to 512 ($2^9$) bytes. The address bit allocation would be different in other examples having different numbers of sectors or of bytes per sector.

Sector, DMA byte, Disk byte and DMA address counters 14, 15, 16 and 17 are each composed of one or more cascaded 74LS461 or equivalent IC's, and have the capacity to count to 32, 512, 512, and 16,777,216, respectively. Counters 14, 15, and 17 are used to transfer data between FTB memory 13 and DMA interface 19. With two-port FTB memory 13, DMA byte counter 15 and DMA address counter 17 are clocked by DMA clock 30, and concurrently increment the address to FTB memory 13 and the address to DMA interface 19 each time a data byte is transferred between the buffer and memory 101. When byte counter 15 overflows, sector number counter/latch 14 is preset from control circuit 11 with the number of the next desired sector.

Disk byte counter 16 is clocked by the disk byte clock 31 and increments the least significant bit of the address to port B of FTB memory 13 each time a new data byte is read from or written to disk 115. For disk transfers the most significant bits of the address to FTB port B are supplied by the sector number lines 50 from formatter 12.

For DMA transfers, the least significant address bits to FTB port A 13 are supplied by DMA byte counter 15, while the most significant address bits are supplied to port A by the sector number counter/latch 14. In this way, counters 15 and 16 are clocked independently, allowing transfers between disk 115 and FTB 13 concurrently with transfers between FTB 13 and system memory 101.

The sector wanted indicator is, in this example, a 32×8 bit (32 individually addressable 8 bit bytes) Sector Wanted Memory (SWM) 18. A type 82S09, while larger than necessary, is suitable for SWM 18. It is loaded with a table indicating wanted sectors on the designated track and whether to read, write, or verify. Address access in SWM 18 is a function of sector number.

Prior to any transfers to or from the disk track, SWM 18 is set up by control circuitry 11 with a "1" in a bit at each address corresponding to a wanted sector, and a "0" in a bit at each address corresponding to an unwanted sector. See Table 2. For example, for a disk read of sectors 3 through 20, a "1" is stored in the "read" bit at addresses between 3 and 20 inclusive and a "0" is stored in the read bit elsewhere (1, 2, and 21–32).

Later, as sectors pass disk head 112, the sector headers are read and each sector number is used as an address to SWM 18. If the bits at a particular address in SWM 18 are all "0," the sector is allowed to pass. If any data bits are a "1," however, the data for that sector is transferred or verified between disk 115 and FTB 13, for example. After that sector has been completed, the "1" bit in SWM 18 is reset to "0." A "done" bit at this same address in the SWM may also be set, and if a transfer error is detected, an "error" bit may be set.

Control circuit 11 may determine whether sectors have been operated upon by checking SWM 18. If the entire track has been successfully transferred, then the SWM should contain all zeroes (or, in the case where "done" bits are used, a "1" at the done-bit positions at all addresses previously set in the SWM). An SWM inquiry may be made by either control circuit 11, by formatting circuit 12, by both, or by equivalent circuitry in alternate embodiments of the invention. The entire SWM may be read or, to save time, only the SWM locations formerly set up as "wanted." When all locations read "0" or "done," all disk/buffer transactions have been completed for the present track and that activity on that track should be terminated.

OPERATION

To clarify the invention, the sequence of events taking place in the FIG. 2 circuitry while executing the transfer of FIG. 1 will be narrated, first for a write operation and second for a read operation.

The data is moved first from memory locations 8000 through 17216 decimal of computer memory 101 into blocks 243 to 260 on disk 115, and second, back from the disk into the same main memory locations.

Example 1

Writing to the Disk

1. Computer 100 issues a command on bus 99 to transfer data from memory 101 starting at location 8000 (decimal) and to write this data onto disk 115, to blocks 243 through 260.

2. Control electronics 11 computes that the intended blocks are on track 10, sectors 3–20 (since 243 divided by 24 sectors-per-track gives "track 10 with a remainder of 3 sectors.")

3. Control electronics 11 instructs disk drive transducer arm 113 to seek to track 10. Then, without necessarily waiting for the seek to be completed, control electronics 11 goes on to the following steps.

4. Control electronics 11 initializes SWM 18 with the data in Appendix Table 2 as derived from the command provided on bus 99. The data bit format of Table 2 is for illustration only, and is just one of many data arrangements possible in the SWM.

5. Control electronics 11 initializes the DMA address counter 17 to "8000" (decimal).

6. Control electronics 11 initializes sector latch 14 to "3", meaning that sector three will be the lowest-numbered sector to receive data from memory 101.

7. Control electronics 11 zeroes byte counter 15.

8. Control electronics 11, via bus 99, instructs DMA interface circuitry 19 to begin transferring data from computer memory 101 into corresponding blocks in the FTB memory 13 as listed in Appendix Table 1. Appendix Table 3 illustrates the sequence of the DMA transfer. Each time a block (512 bytes) of data has been transferred, DMA byte counter 15 rolls over to zero, and increments the contents of sector counter/latch 14. In this way the FTB address is conveniently set up, ready for transferring the next data block, and control electronics 11 is not required to compute FTB addresses for each sector.

9. Control electronics 11 checks the disk drive 110 status via line 111 to determine if the requested seek has been completed. If head 112 still has not arrived at track 10, the controller waits until it does.

10. Once the track seek has been completed, the FTB-to-disk data transfer may begin almost immediately. The actual sequence of events during the transfer depends on where along the track the disk head happens to be when the seek is completed or when the buffer 13 is ready with data. In one typical case as portrayed in FIG. 1, head 112 settles on track 120 mid-way through sector 8. Hence, the header in sector 9 is the first to be read. Appendix Table 4 lists the sequence of events during the disk transfer. In a more advanced embodiment, the disk write step may begin before the DMA transfer of step 9 has been fully completed.

After the sector 9 header has been read, the sector ID number ("9") is used on bus 50 as the address for SWM 18 as well as for the most significant address bits to FTB memory 13. In this way, the "in-order" to "out-of-order" conversion is inherently performed. Hence, the data for sector 9 will automatically be read from the correct section of FTB memory 13. Since the SWM write data bit is "1", the data bytes (512 in these examples) are written, one-by-one, to sector 9 on the disk. Each time a byte is written, byte counter 16 is incremented, causing bytes to be fetched from successive locations in FTB 13. When the byte count passes 511, counter 16 rolls over to zero and the transfer for sector 9 stops. Sectors 10-20 are handled in the same way. After each successful sector transfer, the "write" bit in SMW 18 for that sector is reset to zero, and the "done" bit, if any is used in the particular implementation, is set to "1".

Finally, when the sector 21 header is read, SWM 18 will output a "0" write bit (instead of a "1"), indicating that the sector is not to be written, so no write occurs to this sector. The same is true for sectors 22 through 24, 1 and 2.

When the sector 3 header is read, the SWM "write" data bit is "1" again, so sector 3 is written. The process is repeated for sectors 4, 5, 6, 7, and 8. When sector 8 has been written, all write bits in SMW 18 will have been zeroed. This indicates to controller 11 that the transfer for that track is complete. The invention 10 is now free to carry out its next command.

Example 2

Reading from the Disk

1. Computer 100 issues a command on bus 99 to read blocks 243-260 from disk 115 and to transfer the data to memory 101, starting at location 8000.

2. Control electronics 11 computes that the wanted blocks are on track 10, sectors 3-20 (the same as in the writing example).

3. Control electronics 11 instructs drive 110 to seek to track 10. Then, without necessarily waiting for the seek to be completed, control electronics 11 goes on to the following steps (as in the writing example).

4. Control electronics 11 initializes SMW 18 with data similar to that in Table 2, except that the read bit (instead of the write bit) is a "1" at each SMW location corresponding to a wanted sector (3 through 20).

5. Control electronics 11 checks disk drive 110 to determine whether the seek has been completed. If not, controller 10 waits until it has.

6. Once the seek has been completed, the data transfer may begin almost immediately. The sequence of events is as described in step 10 of the writing example, except that data is read from the disk 115 into FTB 13 instead of the converse. Refer to Table 4 for details. Although sectors 21-24, 1, and 2 are not wanted for this transfer, in certain caching schemes they may be read into the FTB for future use in case they are later requested by computer 100. While the data from the disk is read into FTB 13, the FTB contents may be concurrently transferred to system memory 101, as explained in step 7.

7. Control electronics 11 periodically scans SWM 18 to see which sectors have been read into FTB 13, so that each sector can be transferred to the system memory 101 as soon after it is read as possible. For example, suppose that sector 9 has just been read, and that disk head 112 is just starting to read sector 10. Then, if control electronics 11 reads the SWM "read" bit for all of the wanted sectors, it will find that the "read" bit for sector 9 has been reset to zero, and also that the "done" bit (if any) is set to "1". This means that the sector 9 data has been successfully read from the disk and is now in the FTB, available to be transferred. The control electronics may now instruct DMA interface circuitry 19 to begin preparing for transferring the sector 9 data from the FTB and into the computer memory.

8. Control electronics 11 prepares for the DMA transfer from the FTB 13 into computer memory 101 by initializing the sector latch 14 to "9," meaning that the region of FTB 13 containing data read earlier from sector 9 will be the first region to be transferred into computer memory 101, starting at address 11072, which is the destination address set up in DMA address counter 17 for sector 9. This address, as well as the DMA addresses for all other wanted sectors on the track, could be computed in advance by control electronics 11, and made readily available as in Appendix Table 1. Alternately, it may be computed "on the fly" from the sector number which control circuitry 11 has read from SWM 18 in step 7. Such computations may be completely avoided as described in one of the alternative embodiments below. However, that alternative embodiment is slower since the FTB is not used in a two-port mode.

9. Control electronics 11 zeroes byte counter 15 and instructs the DMA interface 19 to begin transferring data from FTB memory 13 into computer memory 101. Table 5 illustrates the sequence of events which occur during the DMA transfer. This transfer may be done via either direct memory access or programmed transfer, and at a rate the computer system can handle more easily than by the prior art. Again, this step (and steps 7 and 8) may begin before the completion of the data transfers from the disk in step 6. For example, referring to step 6 above, if controller 10 has transferred one or more sectors into the FTB, and is still reading the remaining wanted sectors, the sector(s) already in the FTB could be transferred to memory 101. Thus, sectors 3 through 20 are transferred in essentially a single rotation (actually, slightly more, due to the short interval between the time the head settled and the time the sector 9 header came up).

When the above steps are done, the task is completed and controller 10 is free to carry out its next command, if any.

ALTERNATE EMBODIMENTS OF THE INVENTION

Figure 3:
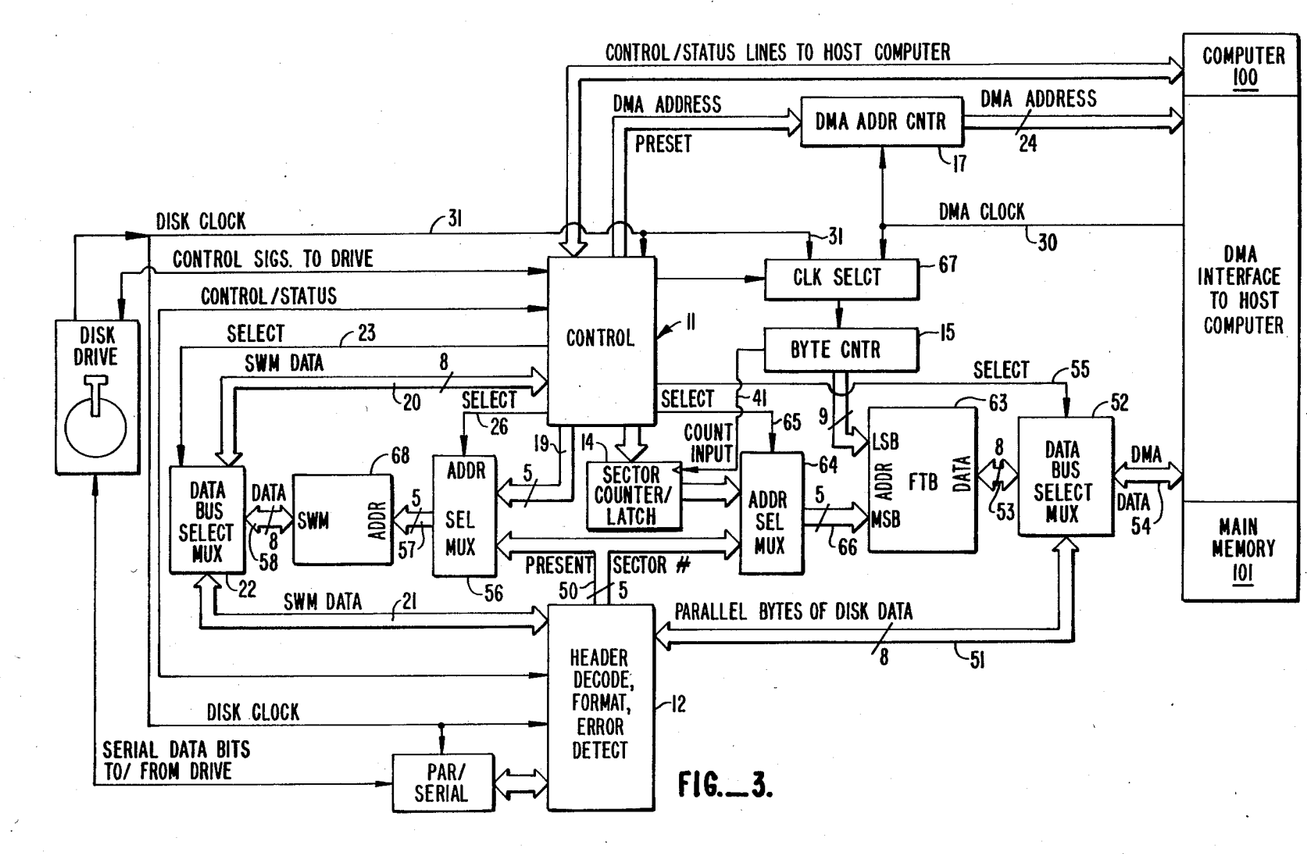
FIG. 3 is an alternative embodiment using one-port memories.

The two-port memories used for SWM 18 and FTB 13 in FIG. 2 may be replaced by one port memories and multiplexers as shown in FIG. 3, but concurrent transfers into and out of the FTB will not be possible.

The control circuitry in this embodiment can be considerably simplified over the earlier-described preferred embodiment, since the buffer is not involved in concurrent disk and main memory transfers. For example, sector counter/latch 14 needs only to be set by the control circuit 11 once for both writes and reads, with the starting memory address for the full transfer (8000 for the previous examples). Also, there is no need for the control circuitry 11 to reinitialize the counter/latch 14 for every sector being transferred. Instead, if may have its "count" input connected to the "carry" output 41 of the byte counter 15, so that each time during the DMA transfer that the byte count reaches 511 and rolls over to zero, the sector counter/latch 14 is incremented. This is possible because in this embodiment, all transfers to or from main memory are in strictly sequential order, (while out-of-order transfers are still possible between disk and FTB).

The one port memory embodiment, although slower than the preferred two port embodiment, can be used in systems which do not tolerate data being transferred in an out-of-order sequence to main memory, while still requiring the speed advantage of out-of-order disk transfers. The speed penalty here is not always severe in the one port embodiment, since DMA transfers in most large (e.g. 16 bits or larger) computer systems are much faster than typical disk transfer rates.

Transfers out of the FTB may be started before completion of, and interleaved with, transfers in if the FTB can alternate rapidly between sending and receiving short streams of data. A data bus multiplexer 52 controlled by select line 55 is used to switch the FTB 63 data bus 53 between disk data bus 51 and DMA data bus 54 for transfers, respectively, to disk drive 110 and to main memory 101. The most significant bits of the FTB 63 address are switched by multiplexer 64 between sector counter/latch 14 for main memory transfers and sector number bus 50 for disk transfers. Switch 67 eliminates byte counter 16, and switches least significant bit counter 15 from the DMA clock line 30 for main memory transfers to disk clock line 31 for disk transfers.

Address and data multiplexers are also provided for one-port SWM 68. Address multiplexer 56, controlled by select line 26, connects one port SWM 68 address bus 57 to receive its address from control address bus 19 while the SWM is set up, and connects bus 57 to present sector number bus 50 to use the SWM for table look-ups. Although SWM 68 is loaded and can be checked by data bus 20 from controller 11, providing multiplexer 22 and bus 21 will allow formatter 12 to access the SWM as well.

Figure 4:
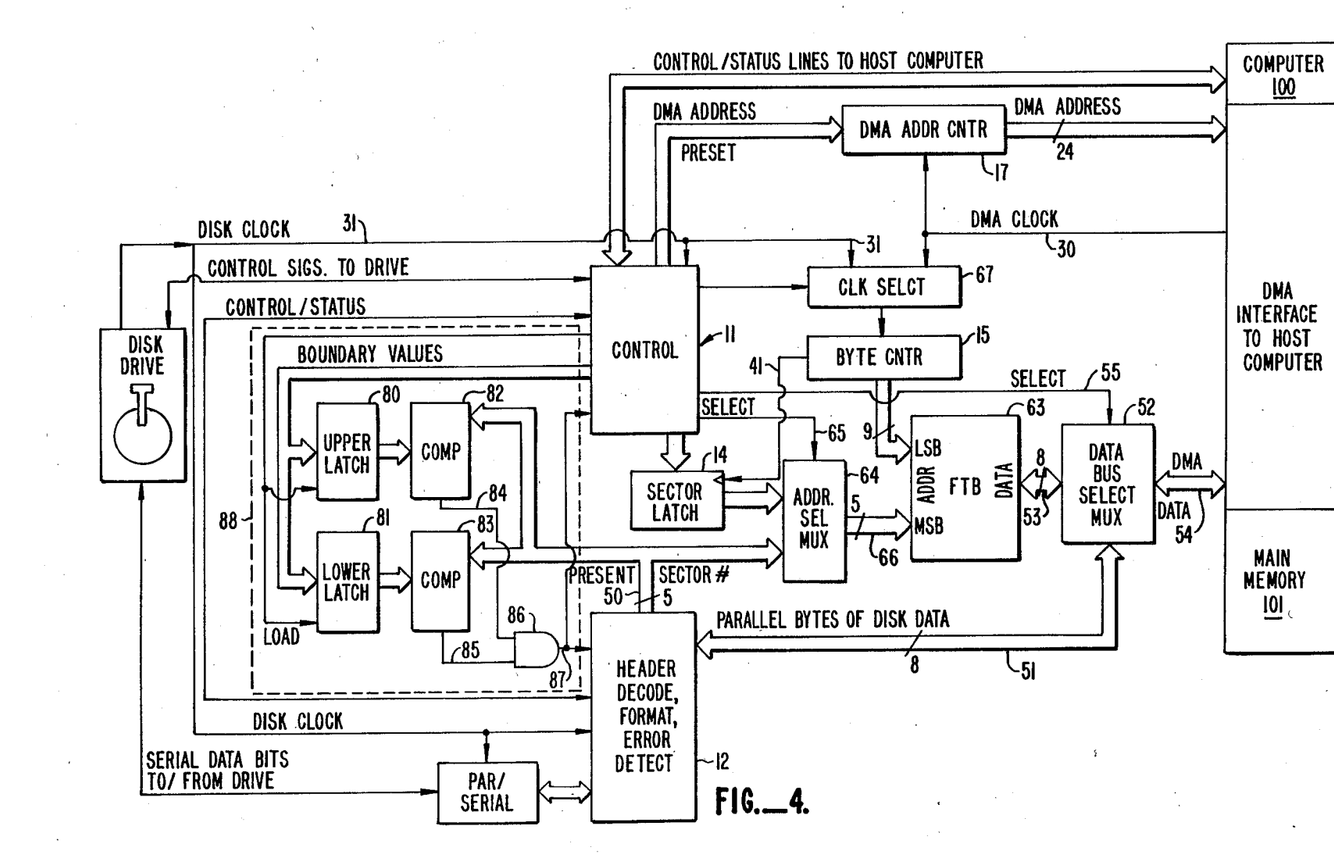
FIG. 4 is an alternative embodiment using digital magnitude comparators instead of a sector wanted memory.

Alternately, the SWMs 18 or 68 may be replaced with a sector wanted indicator 88 comprising a pair of latches, digital magnitude comparators, and a gate, as in FIG. 4. Prior to the transfer, control circuit 11 sets up latches 80 and 81 with the desired highest wanted sector number and lowest wanted sector number, respectively. For example, if sectors 3 through 20 are wanted, latch 80 is loaded with the number 20, and latch 81 with the number 3. Then, during the transfer as the sectors pass one-by-one under the head, to determine whether a sector is wanted, the decoded sector identification number on bus 50 from formatter 12 is applied to comparators 82 and 83. Comparator 82 compares the sector number with the "upper bound" in latch 80 and gives a "true" signal on line 84 for a sector number less than or equal to this upper bound. Similarly, comparator 83 compares the sector number with the "lower bound" in latch 81 and gives a "true" signal on line 85 for a sector number greater than or equal to the lower bound. The two lines are ANDed together by gate 86. The output signal from gate 86 on line 87 is high when both comparators indicate "true," i.e., when the sector is wanted. Signal 87 is used in the same way as the output of SWM 18. If the signal on line 87 is a "1" (true), the sector is "wanted". If it is a "0" (false), the sector is "not wanted."

The above description and Figures are for illustration only, and not to convey the sole manners of implementing the invention. For example, the circuitry could be implemented using a microprocessor or microcontroller. In such an implementation, instead of using a separate SWM or discrete latches, comparators and gates for 80, 81, 82, 83 and 85, the comparisons will be done under control of a programmed microprocessor. The sector wanted indicator would be a table in the RAM memory used by the microprocessor and loaded as shown in Appendix Table 2. The comparisons may be done in software instead of by comparators 82 and 83. The formatting control 12 function could also be implemented in the microcontroller. Most functions of circuitry 10 would be carried out in software, rather than by discrete hardware, but the conceptual way in which the invention operates would be the same.

While the above provides a complete description of the preferred embodiments of the invention, various modifications, alternate constructions and equivalents may be employed as desired. For example, those skilled in the art could apply the principles of the invention to rotating optically recorded data storage surfaces as well as to magnetic surfaces. The sequence of sectors on an optically recorded circular track could be like that shown in the FIG. 1 schematic. Therefore, the above description and illustrations should not be construed as limiting the scope of the invention, which is defined by the appended claims.

TABLE 1

Basic scheme for transferring sectors in the order in which they appear at the disk head.
APPENDIX

| SECTOR NUMBER | DESIRED DMA ADDRESS | WANTED BIT | SEQUENCE OF TRANSFERS (USING INVENTION) |
|---|---|---|---|
| 1 | transfer not desired | 0 | (2) Dead time |
| 2 | transfer not desired | 0 | |
| 3 | 8000 | 1 | (3) Transfer of |
| 4 | 8512 | 1 | sectors 3 |
| 5 | 9024 | 1 | through 8 |
| 6 | 9536 | 1 | |
| 7 | 10048 | 1 | |
| 8 | 10560 | 1 | |
| 9 | 11072 | 1 | (1) Transfer |
| 10 | 11584 | 1 | of sectors 9 |
| 11 | 12096 | 1 | through 20 |
| 12 | 12608 | 1 | |
| 13 | 13120 | 1 | |
| 14 | 13632 | 1 | |
| 15 | 14144 | 1 | |
| 16 | 14656 | 1 | |
| 17 | 15168 | 1 | |
| 18 | 15680 | 1 | |
| 19 | 16192 | 1 | |
| 20 | 16704 | 1 | |
| 21 | transfer not desired | 0 | (2) Dead time |
| 22 | transfer not desired | 0 | |
| 23 | transfer not desired | 0 | |
| 24 | transfer not desired | 0 | |

TABLE 2

Contents of SWM for transferring sectors 3 to 20.

| ADDRESS: | DATA: |
|---|---|
| | READ / WRITE / VERIFY / (RFU) / (RFU) / CRC ERR / VFY ERR / DONE |
| 1 | 00000000 |
| 2 | 00000000 |
| 3 | 01000000 |
| 4 | 01000000 |

TABLE 2-continued
Contents of SWM for transferring sectors 3 to 20.

| ADDRESS: | DATA: |
|---|---|
| 5 | 01000000 |
| 6 | 01000000 |
| 7 | 01000000 |
| 8 | 01000000 |
| 9 | 01000000 |
| 10 | 01000000 |
| 11 | 01000000 |
| 12 | 01000000 |
| 13 | 01000000 |
| 14 | 01000000 |
| 15 | 01000000 |
| 16 | 01000000 |
| 17 | 01000000 |
| 18 | 01000000 |
| 19 | 01000000 |
| 20 | 01000000 |
| 21 | 00000000 |
| 22 | 00000000 |
| 23 | 00000000 |
| 24 | 00000000 |

TABLE 3
Register status during the DMA transfer.

| DMA ADDRESS COUNTER 17 | BYTE COUNTER 15 | SECTOR LATCH 14 | SWM WRITE DATA BIT: | |
|---|---|---|---|---|
| 8000 | 0 | 3 | 1 | Sector 3 |
| 8001 | 1 | 3 | 1 | transferred |
| 8002 | 2 | 3 | 1 | |
| . | . | | | |
| 8511 | 511 | 3 | 1 | |
| 8512 | 0 | 4 | 1 | Sector 4 |
| 8513 | 1 | 4 | 1 | transferred |
| . | . | | | |
| 9023 | 511 | 4 | 1 | |
| . | | | | Sectors |
| . | | | | 5-19 |
| . | | | | transferred |
| 16704 | 0 | 20 | 1 | Sector 20 |
| 16705 | 1 | 20 | 1 | transferred |
| . | . | | | |
| 17215 | 511 | 20 | 1 | |
| 17216 | 0 | 21 | 0 | DMA transfer finished |

TABLE 4
Events during data transfer between buffer 13 and a disk track.

| BYTE COUNTER 16 | SECTOR NUMBER: | SWM WRITE DATA BIT: 18 | COMMENTS |
|---|---|---|---|
| | | | Header read (ID=9) |
| 0 | 9 | 1 | Data transfer |
| 1 | 9 | 1 | (Sector #9) |
| . | . | . | |
| 511 | 9 | 1 | |
| 0 | 10 | 1 | Header read (ID=10) Data transfer |
| 1 | 10 | 1 | (Sector #10) |
| . | . | . | |
| 511 | 10 | 1 | |
| 0-511 | 11 | 1 | Same as above for Sectors 11 thru 20 |
| . | . | . | |
| 0-511 | 20 | 1 | |
| NONE | 21 | 0 | No transfers |
| NONE | 22 | 0 | wanted* |
| NONE | 23 | 0 | (SWM=0 for |
| NONE | 24 | 0 | these sectors) |
| NONE | 1 | 0 | |
| NONE | 2 | 0 | |
| 0-511 | 3 | 1 | Data transfers |
| 0-511 | 4 | 1 | for sectors |
| 0-511 | 5 | 1 | 3 through 8 |
| 0-511 | 6 | 1 | |
| 0-511 | 7 | 1 | |
| 0-511 | 8 | 1 | |
| | | | Data transfers done when all SWM write bits are zero |

TABLE 5
Register status during DMA transfer for disk read for examples discussed in text.

| DMA ADDRESS COUNTER 17 | BYTE COUNTER 15 | SECTOR LATCH 14 | SWM WRITE DATA BIT: | |
|---|---|---|---|---|
| 11072 | 0 | 9 | 1 | Sector 9 |
| 11073 | 1 | 9 | 1 | transferred |
| 11074 | 2 | 9 | 1 | |
| . | . | . | . | |

TABLE 5-continued

Register status during DMA transfer for disk read for examples discussed in text.

| DMA ADDRESS COUNTER 17 | BYTE COUNTER 15 | SECTOR LATCH 14 | SWM WRITE DATA BIT: | |
|---|---|---|---|---|
| 11583 | 511 | 9 | 1 | |
| 11584 | 0 | 10 | 1 | Sector 10 |
| 11584 | 1 | 10 | 1 | transferred |
| . | . | . | . | (note that |
| . | . | . | . | sector 10 |
| . | . | . | . | is not |
| | | | | necessarily |
| 12095 | 511 | 10 | 1 | next sector) |
| | . | | | remaining |
| | | | | sectors |
| | . | | | transferred |

What is claimed is:

1. In a disk drive controller adapted to be connected between a disk drive and a data and control channel from a computer having a CPU and a main memory, the improvement comprising:
    a sector wanted indicator having input terminals, output terminals and a random access memory means with as many addressable storage locations as there are sectors on a track in the disk drive, initializable for any desired combination of wanted sectors according to signals on said data channel, and responsive to disk sector identification numbers applied in any order to its input terminals by producing at its output terminals sector wanted signals indicative of whether data is to be transferred between the data channel and the identified disk sector.

2. An improved disk drive controller as in claim 1 further comprising:
    a control circuit connected between said data channel, said disk drive, and the input and output terminals of said sector wanted indicator, for receiving data block numbers and transfer instructions from said data channel, and sending said data block numbers and said transfer instructions to said disk drive and to said sector wanted indicator, and
    a formatter circuit connected to communicate instructions and status information to said control circuit, to communicate serialized sector content signals to and from said disk drive and parallel sector content signals to and from said sector wanted indicator and said data channel.

3. The invention of claim 2 wherein said control circuit includes means for initially setting a sector wanted bit to a preselected value at each addressable storage location corresponding to a wanted sector, and means for changing said preselected value when the transfer instruction has been completed for a given sector.

4. The invention of claim 2 wherein said control circuit includes means for setting a sector done bit to a preselected value at each addressable storage location corresponding to a wanted sector when the transfer instruction has been completed for a given sector.

5. The invention of claim 2 wherein said control circuit includes means for setting a transfer error bit to a preselected value at each addressable storage location corresponding to a wanted sector when the transfer instruction has been completed for a given sector and an error has occurred during the corresponding transfer.

6. A disk drive controller as in claim 1 further comprising:
    a source of disk byte transfer clock signals;
    a source of DMA byte transfer clock signals;
    at least one counter clocked by a respective one of said clock signal sources for counting disk byte transfers and direct memory access byte transfers, respectively and having a carry output;
    a sector counter/latch which may be preset by said control circuit with a sector identification number, and which may also be incremented by the carry output, to count full-sector DMA transfers;
    a full track buffer RAM having most significant bit terminals to which both said sector identification numbers and signals derived by said control circuit which presets said sector counter/latch from said sector wanted signals are applied, least significant bit terminals connected to said counters, and having data I/O terminals through which sector data is transferred alternately to said data channel and to said disk drive in response to the signals to said buffer address terminals.

7. A disk drive controller as in claim 6 wherein
    said sector wanted memory has first and second address ports and first and second data ports, the first ports being connected to said control circuit and the second ports being connected to said formatting circuit,
    said at least one counter comprises a direct memory access counter and a disk byte counter, and
    said full track buffer has first and second address terminal ports, the most significant bits of which are connected to said sector counter/latch and said formatting circuit respectively, and the least significant bit of which are connected to said DMA byte counter and to said disk byte counter respectively, and first and second data ports connected to said data channel and to said formatter circuit, respectively.

8. A disk drive controller as in claim 6 further comprising:
    an SWM address port multiplexer and an SWM data port multiplexer to connect the ports alternately to said control circuit and to said formatter circuit;
    a clock select switch to connect said at least one byte counter alternately to said disk byte clock source and to said DMA byte clock source;
    an FTB address port multiplexer to connect the most significant bits of the FTB address alternately to said sector counter/latch and to said formatter circuit; and
    an FTB data port multiplexer to connect said FTB data port alternately to said data channel and to said formatter.

9. A disk drive controller as in claim 6 wherein said sector counter/latch is initializable, by said control circuit before each full-sector direct memory access transfer, to latch the number of the sector to be transferred.

10. A disk drive controller as in claim 9 wherein said latch is incremented each time the direct memory access transfer for a given sector is completed.

11. For use in an electronic data storage and retrieval system including a central processing unit;

a main memory having address terminals and data input-output terminals through which information signals may be written to or read from locations in said memory according to address signals applied to said address terminals;

a communication channel having lines connected to said address and I/O terminals; and a mass storage device having at least one rotating recording surface and a transducer head disposed adjacent said surface in a plane perpendicular to the arc of rotation;

a mass storage device access controller comprising:

a control circuit, connected between said central processing unit and said storage device, for receiving from said CPU data block numbers to be written and read and for transmitting track seeking instructions to said device;

a disk byte counter and a DMA byte counter, both connected to said control circuit;

a formatting circuit, connected to said control circuit and to said storage device, for serializing and deserializing data being sent to and received from said storage device, respectively, and having a present sector number bus on which said formatter outputs in parallel sector identification numbers received from said storage device, and having a parallel data input/output bus on which said formatting circuit outputs data received from said device and receives data being sent to said device;

a sector wanted indicator having data terminals connected to said control circuit and address and data terminals connected to said formatting circuit whereby said indicator may be initialized to provide, at said data terminals, an indication whether a sector, specified by an address signal at said indicator address terminals, is wanted; and a full track buffer having corresponding to each sector on track of the storage device, storage capacity for an amount of data equivalent to the capacity of the sector, said buffer having address terminals the most significant bits of which are alternately connectable to said formatter circuit and to said control circuit, the least significant bits of which are alternately connectable to either of said byte counters, said buffer also having data terminals which are alternately connectable to said main memory and to said formatting circuit.

12. The method of transferring data between a data channel and a disk drive in any order that sector numbers may be read from the disk, comprising the steps of:

providing a disk drive controller with a sector wanted indicator and a full track buffer;

providing signals on the data channel indicative of sector numbers to be transferred;

initializing the sector wanted indicator according to the signals on the data channel to indicate whether each sector is to be transferred and, if data is being written from the data channel to the disk, initializing the full track buffer;

comparing the sector header number as each sector is read to the sector wanted indicator;

using said sector identification number to address the appropriate block in the full track buffer; and transferring sector data between said appropriate block and sector data field on the disk.

* * * * *